United States Patent [19]

Switall

[11] 4,394,873

[45] Jul. 26, 1983

[54] FLUID VALVE WITH COMPRESSIBLE CHANNEL

[75] Inventor: Thomas G. Switall, Wheeling, Ill.

[73] Assignee: Ryco Graphic Manufacturing, Inc., Wheeling, Ill.

[21] Appl. No.: 145,370

[22] Filed: Apr. 28, 1980

[51] Int. Cl.³ .............................................. F16K 31/143

[52] U.S. Cl. .................................. 137/613; 251/114; 251/62; 251/122; 251/288; 251/297; 138/45

[58] Field of Search ................. 251/122, 297, 84, 114, 251/288, 62; 137/614.14, 625.33, 862, 613; 101/147; 239/533.13; 138/45

[56] References Cited

U.S. PATENT DOCUMENTS

| | | | |
|---|---|---|---|
| 1,407,098 | 2/1922 | Stichler | 138/45 |
| 1,657,663 | 1/1928 | Devereux | 138/45 |
| 3,095,175 | 6/1963 | Iketoni | 138/45 |
| 3,422,835 | 1/1969 | Watts | 251/122 |
| 3,827,671 | 8/1974 | Bolden et al. | 251/84 |
| 4,015,631 | 4/1977 | Hayes | 137/625.33 |
| 4,064,801 | 12/1977 | Switall | 101/147 |
| 4,130,136 | 12/1978 | Garnier et al. | 251/368 |
| 4,142,543 | 3/1979 | Krause et al. | 251/297 |
| 4,198,907 | 4/1980 | Switall | 101/147 |
| 4,211,258 | 7/1980 | Switall | 251/62 X |
| 4,236,518 | 12/1980 | Floyd | 137/614.14 |

*Primary Examiner*—A. Michael Chambers
*Attorney, Agent, or Firm*—Lee, Smith & Jager

[57] ABSTRACT

A fluid valve controls the delivery of fluid through a passageway by employing a novel valve construction in which a channel within the passageway is adjusted both in size and configuration. A resilient, flexible valve element defines the channel, and the valve element may be adjustably and incrementally compressed to obtain a gradual restriction in the passageway. By adjusting the size of the channel the rate of fluid flow may be controlled. The fluid valve may be used, for example, to control the amount of dampening fluid supplied to the ink roll or offset plate on the plate cylinder of an offset printing press, and will find application in any fluid delivery system where precise control of fluid flow is crucial.

16 Claims, 6 Drawing Figures

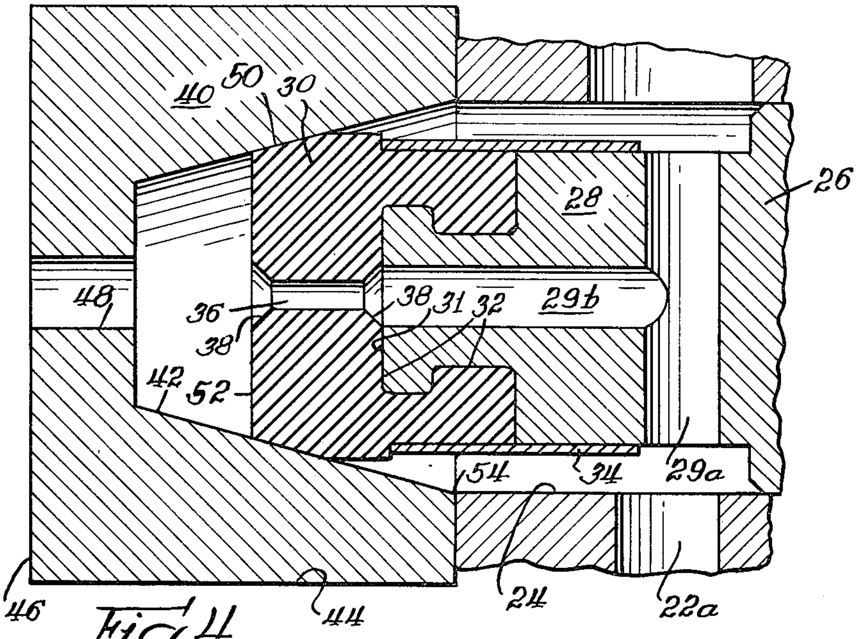
Fig. 4.
Fig. 3.
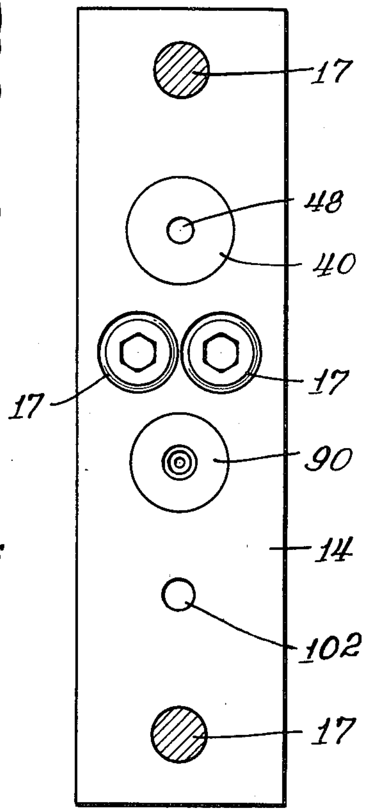
Fig. 5.
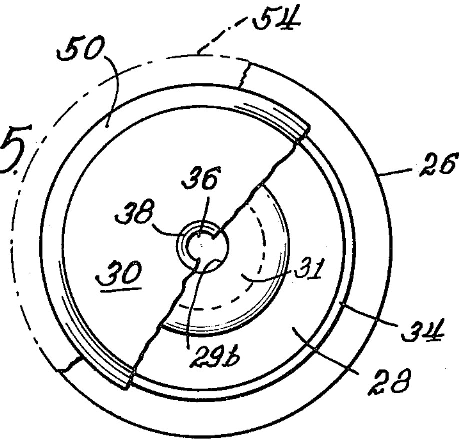
Fig. 6.
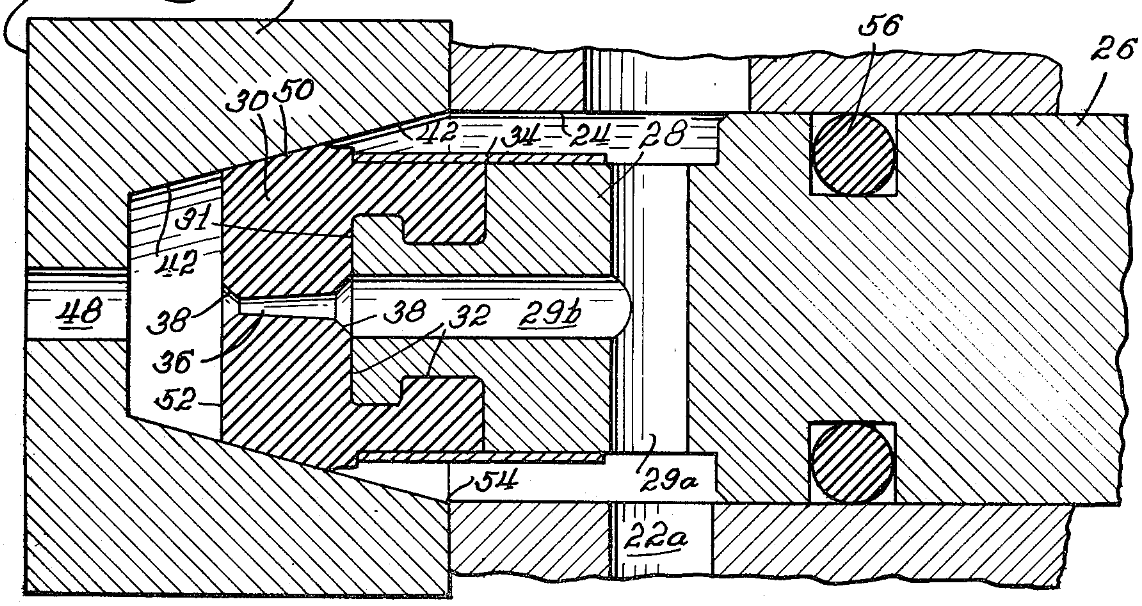

FLUID VALVE WITH COMPRESSIBLE CHANNEL

THE BACKGROUND OF THE INVENTION

This invention relates to an improved fluid valve for regulating the rate of fluid flow in a fluid line or passageway, and more particularly relates to a fluid valve for accurately controlling the amount of dampening fluid delivered to a nozzle for application onto the plate cylinder of an offset printing press.

In the offset printing process, high quality printing is highly dependent upon accurate control of the amount of dampening solution applied to the offset plate. It is thus highly desirable to accurately control both the rate of application of the dampening solution through the delivery system and out the nozzle and also the interruption and initiation of fluid flow.

This application incorporates by reference U.S. Pat. No. 4,064,801 by Thomas G. Switall entitled "Spray Dampening System For Offset Printing"; application Ser. No. 934,866 filed Aug. 18, 1978 by Thomas G. Switall entitled "Spray Dampening System For Offset Printing With Page Control Assembly" now U.S. Pat. No. 4,211,258, issued July 8, 1980; and application Ser. No. 945,107 filed Sept. 25, 1978 by Thomas G. Switall entitled "Spray Dampening System For Offset Printing With Page Control Assembly" now U.S. Pat. No. 4,198,907, issued Apr. 22, 1980.

The above named patent and patent applications discuss in detail the reasons for requiring precision application of dampening fluid and include descriptions of alternative adjustable fluid valves, such as a needle element within a piston operated valve closure sleeve.

Known fluid valves having the requisite quality of accurately adjustable fluid flow sufficient to maintain high quality printing in an offset printing press have heretofore required extremely close tolerances in construction and the use of various metals, and have been of relatively high cost to produce as compared with the fluid valve of the present invention.

The fluid valve according to the present invention may be constructed without the extremely close tolerances previously required and is less expensive to produce, while improving the precision control over fluid flow regulation.

SUMMARY OF THE INVENTION

According to one embodiment of the invention, a fluid passageway includes a tapered wall portion. A flexible, resilient and preferably elastomeric valve element having a fluid conducting channel therein is inserted for movement in the passageway at least partially within the tapered wall portion of the passageway. Adjusting means is provided to adjustably urge the valve element against the tapered wall portion, thereby radially compressing the valve element and the fluid conducting channel extending therethrough. Thus by regulating the size of the channel through which fluid must pass, the rate of fluid flow through the passageway is regulated.

In the preferred embodiment the tapered wall portion of the passageway is part of a valve seat inserted at one end of the passageway such that the inside wall engages and compresses the valve element as the valve element is urged into the valve seat by the adjusting means.

As constructed, the valve seat is oriented in the passageway with the narrowing taper of the inside wall in the downstream direction. The adjusting means preferably includes a flow adjustment member which is attached to and carries the resilient valve element. The adjustment member has a fluid conducting conduit therein communicating with both the channel in the resilient valve element and the passageway. The flow adjustment member is mounted for axial movement within the passageway to controllably urge the valve element against the tapered inside wall of the valve seat and thereby selectively compress the channel in the resilient valve element through which the fluid passing through the passageway must flow.

The flow adjustment member is preferably threadably mounted in the valve housing so that it may be adjusted by rotation. The degree of threaded adjustment may be governed in precise increments by employing a ratchet.

The valve may also include means for selectively interrupting fluid flow through the passageway so that the fluid valve precisely controls both the rate of fluid flow and fluid cut-off.

BRIEF DESCRIPTION OF THE DRAWINGS

FIG. 3 is a cross-sectional view taken along line 3—3 of FIG. 1, and thus is also an end elevational view of the fluid control block;

FIG. 4 is an enlarged cross-sectional view of the valve seat and valve element with the valve element in initial touching engagement with the tapered wall of the valve seat;

FIG. 5 is an end view of the valve element of FIG. 4 with portions broken away to show the adjusting means; and FIG. 6 is an enlarged cross-sectional view of the valve seat and valve element with the valve element moved forward and partially compressed by the tapered wall of the valve seat.

DESCRIPTION OF THE PREFERRED EMBODIMENT

Figure 2:
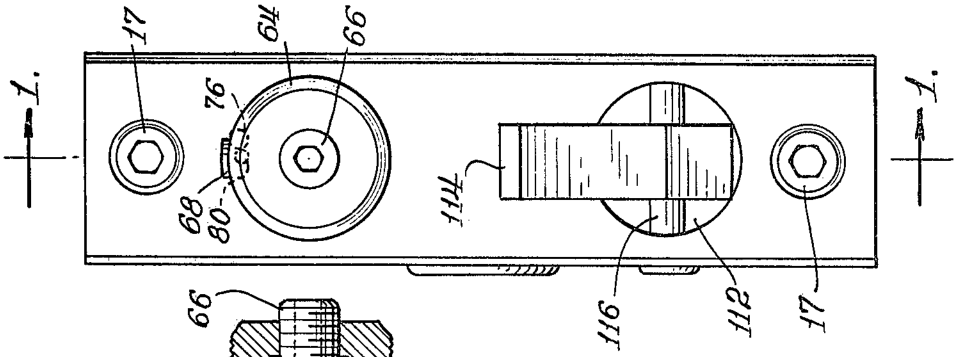
FIG. 2 is an end elevational view of the fluid valve shown in FIG. 1.
Figure 1:
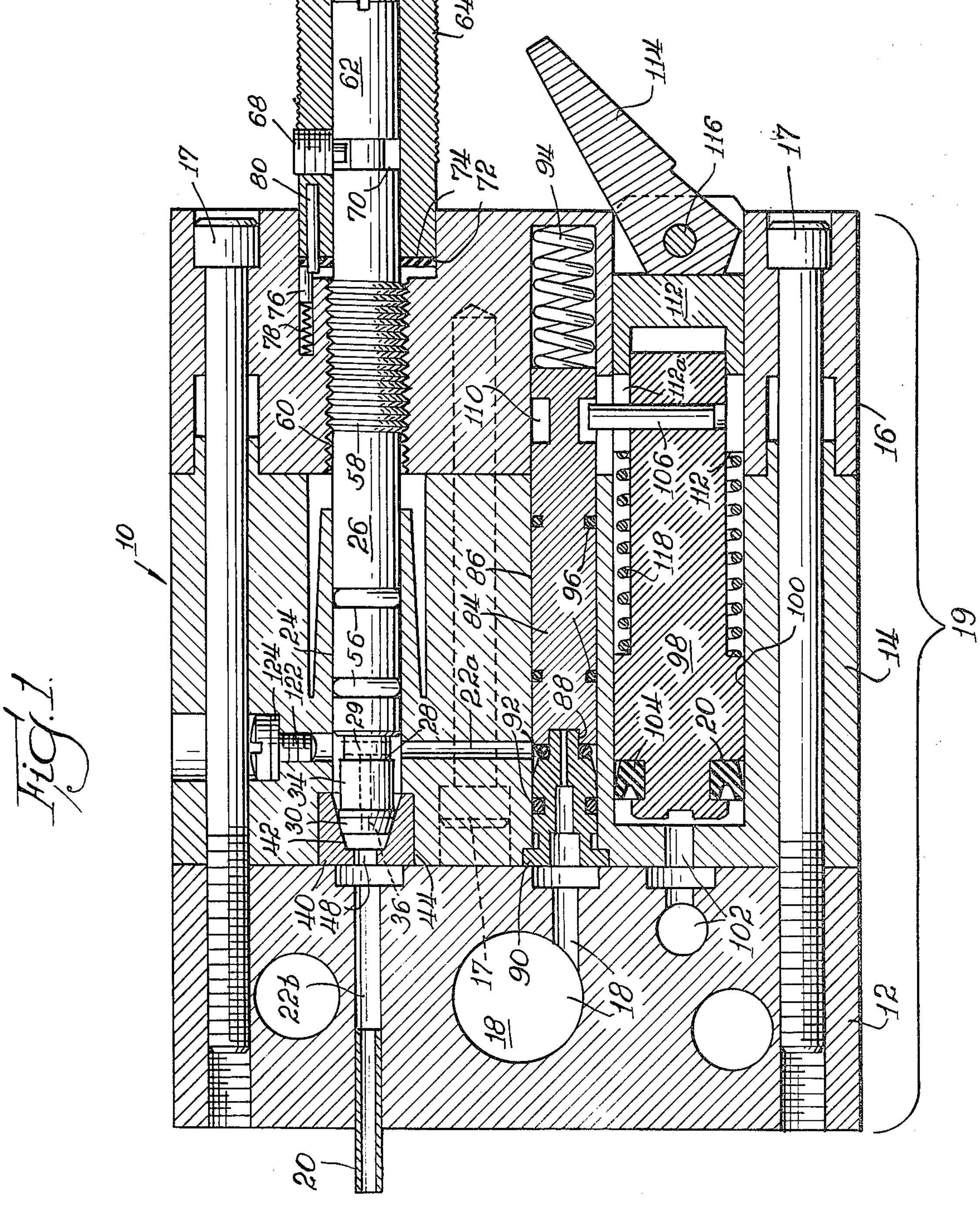
FIG. 1 is a cross-sectional view of a fluid valve constructed in accordance with the preferred embodiment of the invention.

In FIG. 1 there is illustrated a fluid valve 10 constructed in accordance with the present invention, and including a manifold block 12, fluid control block 14 and fluid adjustment block 16, the three blocks being secured to one another by bolts 17 and comprising the valve housing 19. FIG. 2 illustrates an end view of the fluid adjustment block 16. A view of the fluid control block 14 at the end abutting manifold block 12 is illustrated in FIG. 3. Fluid enters the valve through a fluid supply line 18 extending through the manifold block 12. In an installation such as with an offset printing press where dampening fluid must be delivered through a plurality of delivery lines 20, the fluid supply line 18 may supply the fluid to a number of fluid valves 10. Fluid exits the valve 10 through delivery line 20. The housing 19 defines a passageway 22 connecting supply line 18 and delivery line 20.

A fluid regulation means controls the rate of fluid flow through the valve 10 and is disposed within a fluid regulation chamber 24 forming part of the passageway 22 and intermediate of and communicating with the upstream and downstream segments **22*a* and 22*b* respectively of the passageway 22**. Fluid exits the upstream segment 22*a* of the passageway and flows into the chamber 24, following the longitudinal axis of the passageway 22.

Mounted within the chamber 24 for axial movement is a flow adjustment member 26, having an end nozzle 28 for receiving the fluid and discharging it through a center orifice. A fluid conducting conduit 29 within the end nozzle 28 carries the fluid from upstream segment 22*a* to the center orifice on the end 31 of the nozzle. Carried on the end 31 of the nozzle 28 is an adjustably compressible, resilient valve element 30, as best seen in FIG. 4. The valve element 30 has a nozzle conforming cavity 32 which snugly fits about the end of the nozzle 28. The valve element 30 may be securely bound to end nozzle 28 by means of a restraining band 34 around both the valve element 30 and end nozzle 28. An end view of the valve element 30 as in FIG. 4 is shown in FIG. 5, with portions broken away to illustrate the end nozzle 28 of adjustment member 26.

The valve element 30 defines a centrally located, axially extending, fluid conducting channel 36, disposed generally coaxially with the regulation chamber 24. The channel 36 includes flared ends 38.

As has been constructed, and for purposes of illustration only, the valve element 30 has an axial length of between 0.170 and 0.175 inch and a diameter of between 0.205 and 0.215 inch. The nozzle conforming cavity has an axial length of about 0.09 inch. The axial length of the channel 36, including flared ends 38, is between 0.080 and 0.085 inch. The channel 36 has a diameter of between 0.019 and 0.022 inch. The valve element 30 as constructed also includes a 45° chamfer 50, which is 0.015 inch wide, about the outer circumference of the valve element 30 at the seat end 52 thereof. The valve element 30 is resilient and flexible and in the illustrated embodiment is produced from an elastomeric ethylene propylene rubber.

On the side of the valve element 30 opposite the flow adjustment member 26 is a valve seat 40 having a tapered inside wall 42 adapted to accommodate the valve element 30. The valve seat 40 is preferably an insert constructed of Teflon and fits snugly into a widened bore 44 at the inner or discharge end of the fluid regulation chamber 24. The inside wall 42 of the valve seat 40 is tapered, preferably on the order of about fifteen degrees with the upstream end or mouth 54 of the valve seat being wide enough to accommodate the end of the valve element 30 as will be more fully described. Thus, a cross-sectional dimension across the inside wall 42 decreases in the downstream direction. The inside wall tapers to a diameter somewhat less than the diameter of the valve element. The inner end 46 of the valve seat 40 has an aperture 48 through which the fluid passes as it is discharged into the fluid delivery line 20. The aperture 48 is preferably somewhat larger than the flared end 38 of the channel 36 in the end of the valve element 30.

As constructed and again for purposes or illustration only, the valve seat 40 has an axial length of 0.281 inch and a diameter of 0.380 inch. The aperture 48 has a diameter of about 0.055 inch. The tapered inside wall 42 has an axial length of 0.215 inch and at the mouth 54 of the valve seat 40 has a diameter of 0.260 inch.

The fluid conducting conduit 29 in the end nozzle 28 of the flow adjustment member 26 includes a transverse intake portion 29*a* and an axial discharge portion 29*b*. The end nozzle 28 of the flow adjustment member 26 is of reduced cross section so that fluid flowing into the fluid regulation chamber 24 will flow into the transverse intake portion 29*a* of conduit 29, regardless of the position of the adjustment member 26.

The flow adjustment member 26 is an elongated rod-like member disposed axially within the fluid regulation chamber 24. A pair of O-rings 56 provide a fluid seal between the member 26 and the interior walls of the chamber 24 to retain the fluid in the lower end of the chamber, the lower end housing the valve seat 40 and intercepting the upstream segment 22*a* of the passageway 22. The upper portion 58 of the adjustment member 26, above the O-rings 56, is externally threaded and the upper end of the chamber 24 has corresponding internal threads 60. Thus rotation of the adjustment member 26 relative to the valve housing 19 will move the member axially within the chamber.

Above the upper portion 58 of the adjustment member 26 and extending outwardly from the fluid adjustment block 16 of the valve housing 19 is outer end portion 62. A knurled adjustment knob 64 is slid over this outer end portion 62 of member 26 and is held in proper position relative to the end portion 62 by means of the combined action of an axial set screw 66 and a transverse set screw 68, the latter engaging in a groove 70 in the outer end portion 62 of the adjustment member 26. The axial set screw 66 permits rotation and thus axial movement of the knob 64 in relation to the flow adjustment member 26, limited by transverse set screw 68.

A ratchet plate 72 is secured to the adjustment knob 64 at the inner end 74 of the knob. A pawl 76 is carried in a blind hole at the side of the threaded portion 60 of the chamber 24 and is urged toward ratchet plate 72 by pawl compression spring 78 mounted beneath the pawl in the blind hole. Together, ratchet plate 72, pawl 76 and spring 78 form a reversible ratchet. A stop pin 80 mounted in the adjustment knob 64 and projecting from the ratchet plate 72 limits rotation of the adjustment knob 64 and therefore of the flow adjustment member 26 in both directions when the stop pin 80 meets the pawl 76.

Together the flow adjustment member 26, knurled adjustment knob 64 and ratchet comprise an adjusting means for movement of the valve element 30 relative to the valve seat 40. The adjusting means, valve element 30 and valve seat 40 comprise a fluid regulation means capable of highly precise adjustment in regulating the amount of fluid passing through the fluid valve 10.

As discussed above, fluid exiting the upstream segment 22*a* of the passageway 22 freely communicates with the transverse intake portion 29*a* of the fluid conducting conduit 29 disposed in the end nozzle 28 of flow adjustment member 26. As seen best in FIG. 4, as the valve element 30 is initially urged against the valve seat 40 by the adjusting means, the chamfer 50 about the outer circumference at the seat end 52 engages the tapered inside wall 42 of the valve seat 40. Such contact creates an effective seal, so that all fluid entering the chamber 24 must now pass through the fluid conducting conduit 29 and the channel 36 in the valve element 30. Fluid flow about the outside of the valve element 30 into the valve seat 40 is thus precluded.

The fluid exits the fluid conducting conduit 29 at the end 31 of the end nozzle 28 and enters the fluid conducting channel 36 of the valve element 30. As seen in FIG. 4, wherein the valve element 30 is in the open position, fluid exiting the channel 36 enters the opening defined by the tapered inside wall 42 of the valve seat 40. The fluid exits the valve seat 40 through the aperture 48 in the inner end 46 of the seat 40, thereby communicating with the downstream segment 22*b* of the passageway 22. The fluid then continues out the fluid valve 10 into delivery line 20.

To adjust the flow of fluid through the regulation chamber 24 as just described, the adjustment member 26 and adjustment knob 64 are rotated clockwise, thereby moving the adjustment member 26 with the valve element thereon toward the valve seat 40. The valve element 30 is further radially inwardly compressed by the tapered inside wall 42 of the valve seat 40, especially at the seat end 52 of the valve element. The valve element is resilient an flexible and therefore the fluid conducting channel 36 is also inwardly, radially compressed, as illustrated in FIG. 6, reducing a cross-sectional dimension across the channel and thus a cross-sectional area of the channel 36, at least toward the seat end 52 of the valve element 30. It is believed that the flared ends 38 of the channel 36 enable more precise control of the size and configuration of the channel 36.

Restricting the size of the channel 36 reduces the fluid flow through the passageway 22, the fluid conducting conduit 29 and channel 36. Less fluid can then exit the fluid valve 10 into the fluid delivery line 20. Counterclockwise rotation of the adjustment member 26 via knob 64 will withdraw the valve element 30 from the valve seat 40, restoring the channel 36 to its open configuration seen in FIG. 4, and increasing fluid flow.

The ratchet plate 72 and pawl 76 permit axial adjustment of the valve element 30 in precise increments. The axial movement of the valve element 30 is however limited in both directions by the stop pin 80 embedded in the adjustment knob 64. However, the limits themselves are adjustable through the use of the two set screws 66, 68, which are used to position the knob 64 with respect to the flow adjustment member 26. This allows for changing the axial operating range of the flow adjustment member 26. The pawl compression spring 78 permits proper engagement of the pawl 76 with the ratchet plate 72 even if the ratchet plate 72 is moved toward or away from the pawl 76 by rotation of the adjustment knob 64 about the flow adjustment member 26. The ratchet permits adjustment of the valve element 30 relative to the valve seat 40 in precise increments. The stop pin defines the operating range of the adjusting means. The set screws permit the range itself to be adjusted.

The valve seat 40 and valve element 30 allow for precisely regulated control of fluid flow without the high cost of precision engineering necessary for existing precision valves. As has been constructed in the preferred embodiment however, the fluid valve 10 includes not only this fluid regulation means but also a fluid interruption means.

The fluid interruption means is incorporated into the fluid valve 10. The fluid interruption means is capable of precisely controlled initiation and interruption of fluid flow through the fluid valve 10. The fluid interruption means works with the fluid regulation means described above to provide a fluid valve 10 which can precisely control fluid flow by both fluid flow rate and by total fluid flow interruption.

In the preferred embodiment of the invention the fluid interruption means is disposed upstream of the fluid regulation means. The interruption means includes a fluid shut off piston 84 disposed within a fluid entry cylinder 86 and mounted for movement toward and away from a closed position blocking the flow of fluid from the fluid supply line 18 and entry cylinder 86 into the passageway 22. Other types of shut off members may easily be substituted for the shut off piston 84 used in the preferred embodiment. An insert 90 having an opening therethrough is mounted with insert O-rings 92 in the end of the entry cylinder 86 facing the manifold block 12 and connects the fluid supply line 18 with the entry cylinder 86. The insert 90 provides an underlapping seal with the overlapping end 88 of the shut off piston 84. A shut off compression spring 94 is disposed in the entry cylinder 86 which urges the shut off piston 84 into its closed position, illustrated in FIG. 1. Piston O-rings 96 isolate the fluid in a part of the cylinder 86.

A control member is provided for movement between two predetermined positions to regulate movement of the shut off member. In the preferred embodiment the control member includes a control piston 98 movably disposed within a control cylinder 100. Movement of the control piston 98 is made by a supply of air under pressure, communicating with the control cylinder through an air line 102. Any other power actuated means which is accurately controlled may be used to engage the control member. A seal 104 about the control piston 98 forms a substantially airtight fit between the control piston 98 and control cylinder 100.

A transverse arm 106 is mounted to the control piston 98 and extends through a groove 108 in the housing 19 into a depression 110 in the shut off piston 84. The transverse arm 106 serves as a connecting means between the control member and the shut off member. In the preferred embodiment the control member and shut off member are mounted adjacent one another for parallel movement.

A toggle guide bushing 112 having a slot 112*a* therein is mounted at the end of the control cylinder 100 opposite the air line 102. The bushing 112 is moved between open and closed positions by a manually operated toggle 114 which rotates about an axle 116 mounted in the fluid adjustment block 16 (FIGS. 1 and 2). The slot 112*a* in the bushing 112 fits about the transverse arm 106. A control compression spring 118 is mounted over the control piston 98 between the guide bushing 112 and a rim 120 on the control piston 98.

With the guide bushing 112 in its open position illustrated in FIG. 1, the control piston 98 may be moved between its two predetermined positions. With the air supply off, the control piston maintains its first position illustrated in FIG. 1. When the pressurized air supply is turned on, air enters the control cylinder 100 and forces the control piston toward the guide bushing and into its second position, overcoming the urging of the control compression spring 118.

As the control piston 98 is moved on its second position the transverse arm 106 moves in the groove 108 and engages the shut off piston 84 away from its closed position. Fluid under pressure may thereby exit the insert 90 and flow into the entry cylinder 86 and passageway 22, whereupon the fluid flow is regulated by the previously described regulation means.

Upon shut off of the air supply the compression spring 94 returns the shut off piston 84 to its closed position and the control compression spring 118 returns the control piston 98 to its first position. The toggle 114 provides a manual override to the air supply. When switched off the toggle 114 forces the bushing 112 toward the control piston 98, thereby prohibiting engagement of the shut off piston 84 by the transverse arm 106 until the toggle is switched back on, as in FIG. 1.

The shut off member, control member, connecting means and power actuated means as described comprise a fluid interruption means which permits repeated and abrupt initiation and interruption of the fluid flow through the fluid valve 10. Other fluid interruption means may be provided to alternately turn off and on the fluid flow to the fluid regulating means.

The housing 19 of the fluid valve was constructed of three blocks 12, 14 and 16. Such construction is of low cost and facilitates maintenance, but is not necessary to the invention. As shown in FIG. 1, a bolt 122 and washer 124 plug an opening made during manufacture of the passageway 22. The fluid supply line 18, downstream segment 22b of the passageway, delivery line 20 and air line 102 of course need not be included in the fluid valve 10.

Other constructions may be made which embody the invention. The fluid interruption means of the preferred embodiment could be eliminated. The adjusting means, valve element 30 and valve seat 40 could be constructed so as to allow for complete interruption of fluid flow, the channel 36 compressing to the point of closure, even under fluid pressure.

As has been described above for purposes of illustration, the fluid valve 10 embodying the invention employs a valve seat having a taper of about fifteen degrees on the inside wall 42. This FIGURE is however related to the ratio of the radial turning of the adjustment member 26 in the threads 60 to the axial movement of the adjustment member. Use of a higher ratio would lessen the axial operating range of the adjustment member. This may be compensated for by increasing the angle of taper of the inside wall 42 in the valve seat 40, so that the same degree of radial, inward compression of the valve element 30 may occur over the more limited axial operating range. Thus, as described above, it is seen that the dimensions given earlier for the valve seat 40 and valve element 30 are only relative.

Further variations include reverse placement of the valve seat 40 so that the inside wall 42 is tapered upstream with the valve element 30 on the downstream side of the valve seat 30. The adjusting means may be of a construction different than the flow adjustment member 26. The fluid interruption means may be located downstream of the regulating means. Yet another modification could include a tapered wall portion of the passageway as a substitute for the valve seat 30 such that a cross-sectional dimension of the passageway decreases along the tapered wall portion. Such a construction may however result in increased cost.

While certain features and embodiments of the invention have been described in detail herein, it should be understood that other alternatives and modifications may be employed without departing from the scope and spirit of the invention as defined by the appended claims.

What is claimed is:

1. A fluid valve for regulating the delivery of fluid through a passageway, said fluid valve comprising:

a. a valve seat in the passageway, said valve seat including an inside wall slightly tapered along the longitudinal axis of the passageway such that a cross-sectional dimension across said inside wall decreases in the downstream direction;

b. a flow adjustment member at least partially disposed in, and adjustable along the longitudinal axis of the passageway and including at its lower end a nozzle extending from and of reduced diameter relative to an upper portion of said flow adjustment member;

c. an elastomeric valve element in said passageway upstream of said valve seat and having a fluid conducting channel therein, at least the portion of said valve element having a cross-sectional dimension larger than the smallest cross-sectional dimension of the tapered inside wall and said valve element being attached to said flow adjustment member nozzle for adjustable movement along said valve seat so that said valve element portion will be increasingly radially squeezed as it is moved in the downstream direction while in engagement with said tapered inside wall, and said valve element will be allowed to radially expand, as it is moved by said adjustment member in the upstream direction, d. a fluid conducting conduit through said flow adjustment member in fluid communication with said valve element channel; and e. fluid interruption means disposed upstream of said valve element and said valve seat for interrupting the fluid flow to said passageway.

2. The fluid valve as in claim 1, said fluid conducting channel including flared ends radiating outwardly from said channel.

3. The fluid valve as in claim 1, wherein said valve element is manufactured from ethylene propylene rubber.

4. A fluid regulating valve comprising:

a. means defining a fluid passageway through said valve, said passageway having a slightly tapered wall portion with the taper being such that a cross-sectional dimension of the passageway decreases in one direction along said tapered wall portion;

b. a resilient flexible valve element having a fluid conducting channel therein, at least the portion of said valve element having a cross-sectional dimension larger than the smallest inside cross-sectional dimension of the tapered wall portion and said valve element portion being mounted for slideable movement along the tapered wall portion of said valve passageway, so that said valve element portion will be increasingly radially squeezed as it is moved in said one direction and released when moved in the other direction within the tapered wall portion; and c. a flow adjustment member partially disposed in and adjustable along the longitudinal axis of the passageway, the flow adjustment member including an upper portion, a flow adjustment nozzle extending from and of reduced diameter relative to said upper portion, a fluid conducting conduit through said nozzle in open communication with said passageway and said channel, and a bottom portion fixed to said resilient valve element, wherein axial adjustment of said flow adjustment member pushes said valve element in one direction and pulls said valve element in the other direction within said tapered inside wall to adjustably respectively compress and allow said valve element to expand and thereby regulate the fluid flow through said valve element channel.

5. The fluid valve recited in claim 4, wherein said resilient, flexible valve element is elastomeric.

6. The fluid valve recited in claim 4, and further including fluid interruption means in communication with said passageway for interrupting the fluid flow to said passageway.

7. The fluid valve recited in claim 6, wherein said fluid interruption means is disposed upstream from said passageway.

8. The fluid valve recited in claim 4, said valve element including a nozzle conforming cavity fitting snugly about and holding said valve element to said nozzle so that said adjusting means is operative to push and pull said valve element along the inside wall of said valve seat.

9. The fluid valve recited in claim 8, further including mated threads on an upper portion of said flow adjustment member and in a housing for said valve, wherein said flow adjustment member is rotatably mounted in said housing to effect adjustment of said nozzle along the longitudinal axis of the passageway.

10. The fluid regulating valve of claim 4 wherein the taper of the tapered wall portion is about 15 degrees.

11. A fluid regulating valve comprising:

a. means defining a fluid passageway through said valve, said passageway having a slightly tapered wall portion with the taper being such that a cross-sectional dimension of the passageway decreases in one direction along said tapered wall portion;

b. a resilient flexible valve element having a fluid conducting channel therein, at least the portion of said valve element having a cross-sectional dimension larger than the smallest inside cross-sectional dimension of the tapered wall portion and said valve element portion being mounted for slideable movement along the tapered wall portion of said valve passageway, so that said valve element portion will be increasingly radially squeezed as it is moved in said one direction and released when moved in the other direction within the tapered wall portion;

c. means attached to said valve element for slideably moving said flexible valve element in said one and said other direction along said tapered wall portion, whereby as said flexible valve element is moved in said one and said other direction through various positions of adjustment while in engagement with said tapered wall portion, said flexible valve element will be respectively radially inwardly compressed and outwardly released by the tapered wall portion to respectively reduce and increase a cross-sectional dimension of said channel, thereby adjustably regulating the fluid flow through said valve element channel and passageway; and d. fluid interruption means in communication with said valve passageway for interrupting the fluid flow to said valve passageway, said fluid interruption means comprising 1. a fluid shut off member mounted for movement toward and away from a closed position blocking the flow of fluid into said passageway;
2. a control member mounted for movement between two predetermined positions;
3. connecting means operatively connecting said control member to said fluid shut off member, whereby as said control member is moved between its predetermined positions said fluid shut off member will be moved into and out of its closed position; and
4. power actuated means for selectively moving said control member between its predetermined positions.

12. The structure of claim 11, wherein said fluid shut off member and said control member are mounted adjacent one another for parallel movement and said connecting means is a transverse arm extending between said members.

13. The fluid valve recited in claim 11 further including manual override means for forcibly moving said control member in a direction to close said shutoff valve when said power actuated means is activated to open said shut off valve.

14. A fluid regulating valve comprising:

a. means defining a fluid passageway through said valve, said passageway having a tapered wall portion with the taper being such that a cross-sectional dimension of the passageway decreases in one direction along said tapered wall portion;

b. a resilient flexible valve element having a fluid conducting channel therein, at least the portion of said valve element having a cross-sectional dimension larger than the smallest inside cross-sectional dimension of the tapered wall portion and said valve element portion having a cavity and being mounted for movement at least partially within the tapered wall portion of said valve passageway, so that said valve element portion will be increasingly squeezed as it is moved in said one direction within the tapered wall portion;

c. a flow adjustment member for adjustably moving said flexible valve element relative to said tapered wall portion, said member being partially disposed in and adjustable along the longitudinal axis of the passageway, the flow adjustment member including an upper portion, a flow adjustment nozzle fitting snugly into said cavity and extending from and of reduced diameter relative to said upper portion, and a fluid conducting conduit through said nozzle in open communication with said passageway and said channel; and d. a restraining band about said valve element and said nozzle to securely maintain said valve element on said nozzle;

whereby axial adjustment of said flow adjustment member urges said valve element toward and away from said tapered inside wall to adjustably compress said valve element to reduce the cross-sectional dimension of said channel and thereby adjustably regulate the fluid flow through said valve element channel.

15. A fluid regulating valve comprising:

a. means defining a fluid passageway through said valve, said passageway having a tapered wall portion with the taper being such that a cross-sectional dimension of the passageway decreases in one direction along said tapered wall portion;

b. a resilient flexible valve element having a fluid conducting channel therein, at least the portion of said valve element having a cross-sectional dimension larger than the smallest inside cross-sectional dimension of the tapered wall portion and said valve element portion having a cavity for mounting thereto for movement at least partially within the tapered wall portion of said valve passageway, so that said valve element portion will be increasingly squeezed as it is moved in said one direction within the tapered wall portion;

c. a housing for said valve with a threaded part;

d. a flow adjustment means including (1) a flow adjustment member partially disposed in said passageway with threads on an upper portion thereof matable with the threaded part of said housing, (2) a flow adjustment nozzle extending from and of reduced diameter relative to said upper portion, said nozzle fitting snugly about and holding said valve element thereto, and a fluid conducting conduit through said nozzle in open communication with said passageway and said channel, wherein the flow adjustment member is rotatably mounted in said housing to effect adjustment of said nozzle along the longitudinal axis of the passageway, (3) an adjustment knob secured to an outer end portion of said flow adjustment member for adjusting the position of said member, (4) a ratchet operatively engaging said knob for incremental movement of said knob and said flow adjustment member, and (5) a stop pin extending from an inner end of said knob and limiting rotation of said knob and said flow adjustment member upon engagement of said ratchet by said stop pin, whereby axial adjustment of said flow adjustment member urges said valve element toward and away from said tapered inside wall to adjustably compress said valve element to reduce the cross-sectional dimension of said channel and thereby adjustably regulate the fluid flow through said valve element channel.

16. The fluid valve as in claim 15, wherein said adjustment knob is secured to said flow adjustment member in adjustable fashion by means of an axial set screw and a transverse set screw connecting said knob and said member, thereby providing for adjustment of an axial range of said member, as limited by said ratchet and said stop pin.

* * * * *